US007003463B1

(12) United States Patent
Maes et al.

(10) Patent No.: US 7,003,463 B1
(45) Date of Patent: Feb. 21, 2006

(54) SYSTEM AND METHOD FOR PROVIDING NETWORK COORDINATED CONVERSATIONAL SERVICES

(75) Inventors: Stephane H. Maes, Danbury, CT (US); Ponani Gopalakrishnan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/806,425

(22) PCT Filed: Oct. 1, 1999

(86) PCT No.: PCT/US99/22925

§ 371 (c)(1),
(2), (4) Date: Jun. 25, 2001

(87) PCT Pub. No.: WO00/21075

PCT Pub. Date: Apr. 13, 2000

Related U.S. Application Data

(60) Provisional application No. 60/102,957, filed on Oct. 2, 1998, provisional application No. 60/117,595, filed on Jan. 27, 1999.

(51) Int. Cl.
| | | |
|---|---|---|
| *G10L 21/00* | (2006.01) | |
| *G10L 15/00* | (2006.01) | |
| *G06F 15/16* | (2006.01) | |

(52) U.S. Cl. .................. 704/270.1; 704/231; 709/203; 709/201

(58) Field of Classification Search ............. 704/270.1; 709/203

See application file for complete search history.

(56) References Cited

U.S. PATENT DOCUMENTS

| 5,544,228 A | 8/1996 | Wagner et al. |
| 5,594,789 A | 1/1997 | Seazholtz et al. |
| 5,774,857 A | 6/1998 | Newlin |

(Continued)

FOREIGN PATENT DOCUMENTS

EP            0450610 A2    10/1991

(Continued)

OTHER PUBLICATIONS

Patent Abstract of Japan, for publication No.: 09-098221.

(Continued)

*Primary Examiner*—W. R. Young
*Assistant Examiner*—Matthew J. Sked
(74) *Attorney, Agent, or Firm*—Frank V. DeRosa; F.Chau & Associates,LLC

(57) ABSTRACT

A system and method for providing automatic and coordinated sharing of conversational resources, e.g., functions and arguments, between network-connected servers and devices and their corresponding applications. In one aspect, a system for providing automatic and coordinated sharing of conversational resources inlcudes a network having a first and second network device, the first and second network device each comprising a set of conversational resources, a dialog manager for managing a conversation and executing calls requesting a conversational service, and a communication stack for communicating messages over the network using conversational protocols, wherein the conversational protocols establish coordinated network communication between the dialog managers of the first and second network device to automatically share the set of conversational resources of the first and second network device, when necessary, to perform their respective requested conversational service.

6 Claims, 5 Drawing Sheets

U.S. PATENT DOCUMENTS

| | | | |
|---|---|---|---|
| 5,943,648 A * | 8/1999 | Tel | 704/270.1 |
| 5,956,683 A * | 9/1999 | Jacobs et al. | 704/270.1 |
| 5,960,399 A | 9/1999 | Barclay et al. | |
| 6,098,041 A * | 8/2000 | Matsumoto | 704/260 |
| 6,119,087 A * | 9/2000 | Kuhn et al. | 704/270 |
| 6,173,259 B1 * | 1/2001 | Bijl et al. | 704/235 |
| 6,195,641 B1 * | 2/2001 | Loring et al. | 704/275 |
| 6,282,268 B1 * | 8/2001 | Hughes et al. | 379/88.03 |
| 6,282,508 B1 * | 8/2001 | Kimura et al. | 704/10 |
| 6,327,568 B1 * | 12/2001 | Joost | 704/270.1 |
| 6,363,348 B1 * | 3/2002 | Besling et al. | 704/270.1 |
| 6,408,272 B1 * | 6/2002 | White et al. | 704/270.1 |
| 6,456,974 B1 * | 9/2002 | Baker et al. | 704/270 |
| 6,594,628 B1 * | 7/2003 | Jacobs et al. | 704/231 |
| 6,615,171 B1 * | 9/2003 | Kanevsky et al. | 704/246 |
| 2005/0131704 A1 * | 6/2005 | Dragosh et al. | 704/270.1 |

FOREIGN PATENT DOCUMENTS

| | | |
|---|---|---|
| EP | 0654930 A1 | 5/1995 |
| JP | 09-098221 | 4/1997 |
| JP | 10-207683 | 8/1998 |
| JP | 10-214258 | 8/1998 |
| JP | 10-228431 | 8/1998 |
| WO | WO 97/47122 | 12/1997 |

OTHER PUBLICATIONS

Patent Abstract of Japan, for publication No.: 10-207683.
Patent Abstract of Japan, for publication No.: 10-214258.
Patent Abstract of Japan, for publication No.: 10-228431.

* cited by examiner

SYSTEM AND METHOD FOR PROVIDING NETWORK COORDINATED CONVERSATIONAL SERVICES

CROSS-REFERENCE TO RELATED APPLICATIONS

This application is a U.S. National Phase Application filed under 35 U.S.C. 371 based on International Application No. PCT/US99/22925, filed on Oct. 1, 1999, which is based on provisional applications U.S. Ser. No. 60/102,957, filed on Oct. 2, 1998, and U.S. Ser. No. 60/117,595 filed on Jan. 27, 1999.

BACKGROUND

1. Technical Field

The present application relates generally to conversational systems and, more particularly, to a system and method for automatic and coordinated sharing of conversational functions/resources between network-connected devices, servers and applications.

2. Description of Related Art

Conventional conversational systems (i.e., systems with purely voice I/O or multi-modal systems with voice I/O) are typically limited to personal computers (PCs) and local machines having suitable architecture and sufficient processing power. On the other hand, for telephony applications, conversational systems are typically located on a server (e.g., the IVR server) and accessible via a conventional and cellular phones. Although such conversational systems are becoming increasingly popular, typically all the conversational processing is performed either on the client side or on the server side (i.e., all the configurations are either fully local or fully client/server).

With the emergence of pervasive computing, it is expected that billions of low resource client devices (e.g., PDAs, smartphones, etc.) will be networked together. Due to the decreasing size of these client devices and the increasing complexity of the tasks that users expect such devices to perform, the user interface (UI) becomes a critical issue since conventional graphical user interfaces (GUI) on such small client devices would be impractical. For this reason, it is to be expected that conversational systems will be key element of the user interface to provide purely speech/audio I/O or multi-modal I/O with speech/audio I/O.

Consequently, speech embedded conversational applications in portable client devices are being developed and reaching maturity. Unfortunately, because of limited resources, it is to be expected that such client devices may not be able to perform complex conversational services such as, for example, speech recognition (especially when the vocabulary size is large or specialized or when domain specific/application specific language models or grammars are needed), NLU (natural language understanding), NLG (natural language generation), TTS (text-to-speech synthesis), audio capture and compression/decompression, playback, dialog generation, dialog management, speaker recognition, topic recognition, and audio/multimedia indexing and searching, etc. For instance, the memory and CPU (and other resource) limitations of a device can limit the conversational capabilities that such device can offer.

Moreover, even if a networked device is "powerful" enough (in terms of CPU and memory) to execute all these conversational tasks, the device may not have the appropriate conversational resources (e.g., engines) or conversational arguments (i.e, the data files used by the engines) (such as grammars, language models, vocabulary files, parsing, tags, voiceprints, TTS rules, etc.) to perform the appropriate task. Indeed, some conversational functions may be too specific and proper to a given service, thereby requiring back end information that is only available from other devices or machines on the network. For example, NLU and NLG services on a client device typically require server-side assistance since the complete set of conversational arguments or functions needed to generate the dialog (e.g., parser, tagger, translator, etc.) either require a large amount of memory for storage (not available in the client devices) or are too extensive (in terms of communication bandwidth) to transfer to the client side. This problem is further exacerbated with multi-lingual applications when a client device or local application has insufficient memory or processing power to store and process the arguments that are needed to process speech and perform conversational functions in multiple languages. Instead, the user must manually connect to a remote server for performing such tasks.

Also, the problems associated with a distributed architecture and distributed processing between client and servers requires new methods for conversational networking. Such methods comprise management of traffic and resources distributed across the network to guarantee appropriate dialog flow of for each user engaged in a conversational interaction across the network.

Accordingly, a system and method that allows a network device with limited resources to perform complex specific conversational tasks automatically using networked resources in a manner which is automatic and transparent to a user is highly desirable.

SUMMARY OF THE INVENTION

The present invention is directed to a system and method for providing automatic and coordinated sharing of conversational resources between network-connected servers and devices (and their corresponding applications). A system according to one embodiment of the present invention comprises a plurality of networked servers, devices and/or applications that are made "conversationally aware" of each other by communicating messages using conversational network protocols (or methods) that allow each conversationally aware network device to automatically share conversational resources automatically and in a coordinated and synchronized manner so as to provide a seamless conversational interface through an interface of one of the network devices.

In accordance with one aspect of the present invention, a system for providing automatic and coordinated sharing of conversational resources comprises:

a network comprising at least a first and second network device;

the first and second network device each comprising
   a set of conversational resources;
   a dialog manager for managing a conversation and executing calls requesting a conversational service; and
   a communication stack for communicating messages using conversational protocols over the network, wherein the messages communicated by the conversational protocols establish coordinated network communication between the dialog managers of the first and second device to automatically share the set of conversational resources of the first and second network device, when necessary, to perform their respective requested conversational service.

The present invention allows a low resource client device to transparently perform simple tasks locally, as well as complex tasks in binary or analog connection with a server (or other device) having more complex conversational capabilities. The server-side functions (such as speech recognition) can be performed through a regular IP network or LAN network as well as via digital transmission over a conventional telephone line or a packet switched network, or via any conventional wireless data protocol over a wireless network.

Advantageously, the present invention offers a full fledged conversational user interface on any device (such as a pervasive embedded device) with limited CPU, memory and power capabilities (as well as limited conversational resources), which provides complex conversational services using a low resource client device without the need to download, for example, the necessary conversational arguments from a network server. The local capabilities allows the user to utilize the local device without requiring connection, e.g., outside coverage of a wireless phone provider. Also, the cost of a continuous connection is reduced and the difficulties of recoveries when such continuous connections are lost can be mitigated.

These and other aspects, features and advantages of the present invention will be described and become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof. Preferably, the present invention is implemented in software as an application comprising program instructions that are tangibly embodied on a program storage device (e.g., magnetic floppy disk, RAM, CD ROM, ROM and Flash memory) and executable by any device or machine comprising suitable architecture such as one or more central processing units (CPU), a random access memory (RAM), and audio input/output (I/O) interface(s).

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
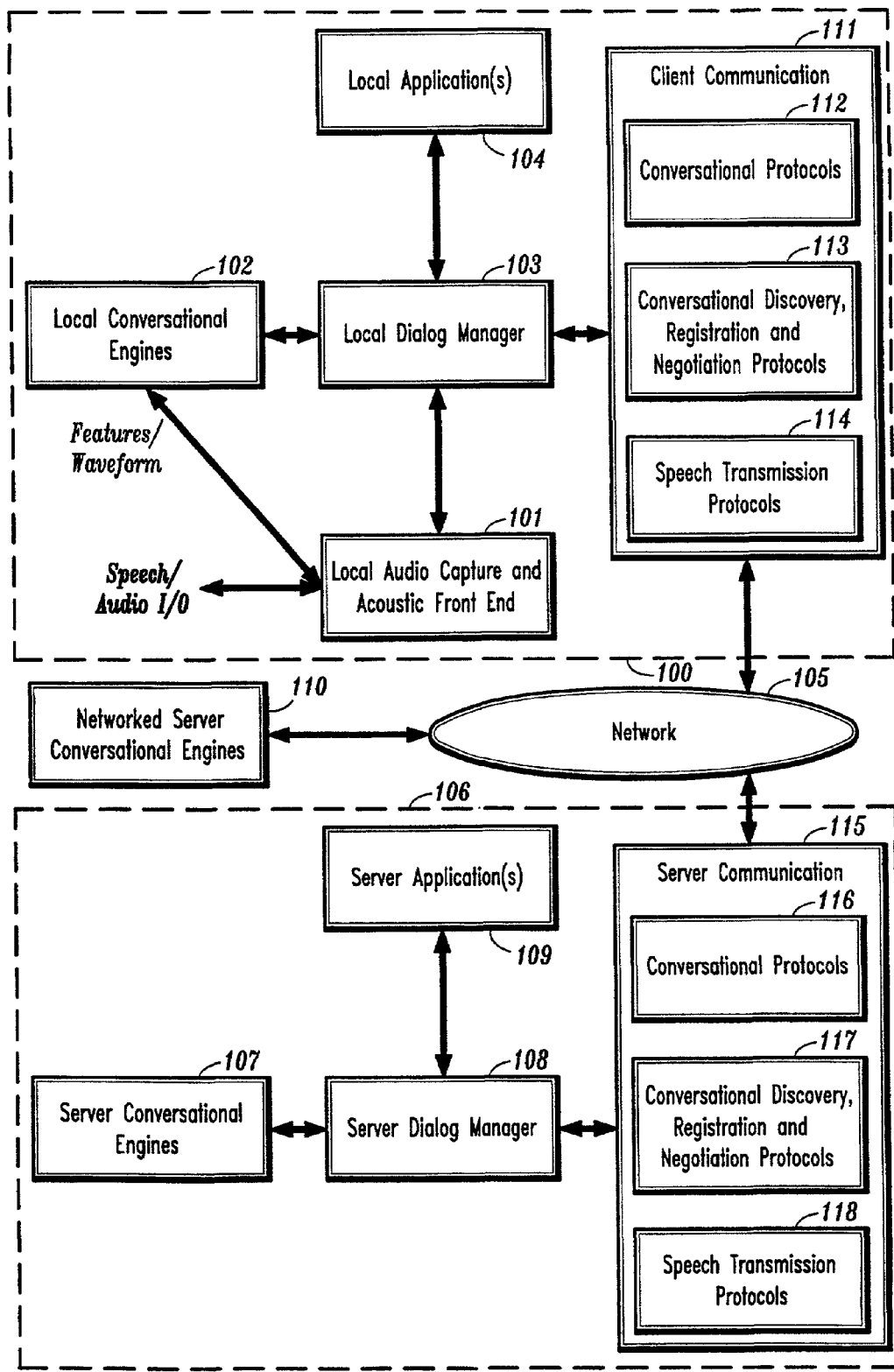
FIG. 1 is a block diagram of a system for providing conversational services via automatic and coordinated sharing of conversational resources between networked devices according to an embodiment of the present invention.

Referring now to FIG. 1, a block diagram illustrates a system for providing conversational services through the automatic and coordinated sharing of conversational resources and conversational arguments (data files) between networked devices according to an exemplary embodiment of the present invention. The system comprises a local client device 100 comprising an acoustic front end 101 for processing audio/speech input and outputting audio/speech generated by the client device 100. The client device 100 may be, for example, a smartphone or any speech-enabled PDA (personal digital assistant). The client device 100 further comprises one or more local conversational engines 102 for processing the acoustic features and/or waveforms generated and/or captured by the acoustic front-end 101 and generating dialog for output to the user. The local conversational engines 102 can include, for instance, an embedded speech recognition, a speaker recognition engine, a TTS engine, a NLU and NLG engine and an audio capture and compression/decompression engine as well as any other type of conversational engine.

The client device 100 further comprises a local dialog manager 103 that performs task management and controls and coordinates the execution of a conversational service (either locally or via a network device) that is requested via a system call (API or protocol call), as well as managing the dialog locally and with networked devices. More specifically, as explained in greater detail below, the dialog manager 103 determines whether a given conversational service is to be processed and executed locally on the client 100 or on a remote network-connected server (or device). This determination is based on factors such as the conversational capabilities of the client 100 as compared with the capabilities of other networked devices, as well the available resources and conversational arguments that may be necessary for processing a requested conversational service. Other factors include network traffic and anticipated delays in receiving results from networked devices. The dialog manager 103 performs task management and resource management tasks such as load management and resource allocation, as well as managing the dialog between the local conversational engines 102 and speech-enabled local applications 104.

As shown in FIG. 1 by way of example, the client device 100 is network-connected via network 105 to a server 106 that comprises server applications 109, as well as server conversational engines 107 for providing conversational services to the client device 100 (or any other network device or application) as necessary. As with the local engines 102, the server engines 107 can include, for instance, an embedded speech recognition, a TTS engine, a NLU and NLG engine, an audio capture and compression/decompression engine, as well as any other type of conversational engine. The server 106 comprises a server dialog manager 108 which operates in a manner similar to the local dialog manager 103 as described above. For example, the server dialog manager 108 determines whether a request for a conversational service from the local dialog manager 103 is to be processed and executed by the server 106 or on another remote network-connected server or device. In addition, the server dialog manager 108 manages the dialog between the server conversational engines 107 and speech-enabled server applications 109.

The system of FIG. 1 further illustrates the client device 100 and the remote server 106 being network-connected to a server 110 having conversational engines and/or conversational arguments that are accessible by the client 100 and server 106 as needed. The network 105 may be, for example, the Internet, a LAN (local area network), and corporate intranet, a PSTN (public switched telephone network) or a wireless network (for wireless communication via RF (radio frequency), or IR (infrared). It is to be understood that although FIG. 1 depicts an client/server system as that term is understood by those skilled in the art, the system of FIG. 1 can include a plurality of networked servers, devices and applications that are "conversationally aware" of each other to provide automatic and coordinated sharing of conversational functions, arguments and resources. As explained in further detail below, such "conversational awareness" may be achieved using conversational network protocols (or methods) to transmit messages that are processed by the respective dialog managers to allow the networked devices to share conversational resources and functions in an automatic and synchronized manner. Such conversational coordination provides a seamless conversational interface for accessing remote servers, devices and applications through the interface of one network device.

In particular, to provide conversational coordination between the networked devices to share their conversational functions, resources and arguments, each of the networked devices communicate messages using conversational protocols (or methods) to exchange information regarding their conversational capabilities and requirements. For instance, as shown in FIG. 1, the client device 100 comprises a communication stack 111 for transmitting and receiving messages using conversational protocols 112, conversational discovery, registration and negotiation protocols 113 and speech transmission protocols 114 (or conversational coding protocols). Likewise, the server 106 comprises a server communication stack 115 comprising conversational protocols 116, conversational discovery, registration and negotiation protocols 117 and speech transmission protocols 118. These protocols (methods) are discussed in detail with respect to a CVM (conversational virtual machine) in the patent application IBM Docket No. Y0999-111P, filed concurrently herewith, entitled "Conversational Computing Via Conversational Virtual Machine," (i.e., International Appl. No. PCT/US99/22927, filed on Oct. 1, 1999 and corresponding U.S. patent application Ser. No. 09/806,565) which is commonly assigned and incorporated herein by reference.

Briefly, the conversational protocols 112, 116 (or what is referred to as "distributed conversational protocols" in Y0999-111P) are protocols (or methods) that allow the networked devices (e.g., client 100 and server 106) or applications to transmit messages for registering their conversational state, arguments and context with the dialog managers of other network devices. The conversational protocols 112, 116 also allow the devices to exchange other information such as applets, ActiveX components, and other executable code that allows the devices or associated applications to coordinate a conversation between such devices in, e.g., a master/slave or peer-to-peer conversational network configuration. The distributed conversational protocols 112, 116 allow the exchange of information to coordinate the conversation involving multiple devices or applications including master/salve conversational network, peer conversational network, silent partners. The information that may be exchanged between networked devices using the distributed conversational protocols comprise, pointer to data files (arguments), transfer (if needed) of data files and other conversational arguments, notification for input, output events and recognition results, conversational engine API calls and results, notification of state and context changes and other system events, registration updates: handshake for registration, negotiation updates: handshake for negotiation, and discovery updates when a requested resources is lost.

The (distributed) conversational protocols also comprise dialog manager (DM) protocols which allow the dialog mangers to distribute services, behavior and conversational applications, I/O and engine APIs such as described in IBM Docket No. Y0999-111P. For instance, the DM protocols allow the following information to be exchanged: (1) DM architecture registration (e.g., each DM can be a collection of locals DMs); (2) pointers to associated meta-information (user, device capabilities, application needs, etc.); (3) negotiation of DM network topology (e.g., master/slave, peer-to-peer); (4) data files (conversational arguments) if applicable i.e., if engines are used that are controlled by a master DM); (5) notification of I/O events such as user input, outputs to users for transfer to engines and/or addition to contexts; (6) notification of recognition events; (7) transfer of processed input from engines to a master DM; (8) transfer of responsibility of master DM to registered DMs; (9) DM processing result events; (10) DM exceptions; (11) transfer of confidence and ambiguity results, proposed feedback and output, proposed expectation state, proposed action, proposed context changes, proposed new dialog state; (12) decision notification, context update, action update, state update, etc; (13) notification of completed, failed or interrupted action; (14) notification of context changes; and/or (15) data files, context and state updates due to action.

For instance, in master-slave network configuration, only one of the networked devices drives the conversation at any given time. In particular, the master device (i.e., the dialog manager of the master device) manages and coordinates the conversation between the network devices and decides which device will perform a given conversational service or function. This decision can based on the information provided by each of the devices or applications regarding their conversational capabilities. This decision may also be based on the master determining which slave device (having the necessary conversational capabilities) can perform the given conversational function most optimally. For instance, the master can request a plurality of slaves to perform speech recognition and provide the results to the master. The master can then select the optimal results. It is to be understood that what is described here at the level of the speech recognition is the mechanism at the level of the DM (dialog manager) protocols between distributed dialog managers (as described in Y0999-111P). Indeed when dialog occurs between multiple dialog managers, the master will obtain measure of the score of the results of each dialog manager and a decision will be taken accordingly to see which dialog manager proceeds with the input, not only on the basis of the speech recognition accuracy, but based on the dialog (meaning), context and history (as well as other items under consideration, such as the preferences of the user, the history, and the preferences of the application.

In peer-to-peer connections, each device will attempt to determine the functions that it can perform and log a request to do so. The device that has accepted the task will perform such task and then score its performance. The devices will then negotiate which device will perform the task based on their scores.

In one embodiment, the distributed conversational protocols 112, 116 are implemented via RMI (remote method invocation) or RPC (remote procedure call) system calls to implement the calls between the applications and the different conversational engines over the network. As is known in the art, RPC is a protocol that allows one application to request a service from another application across the network. Similarly, RMI is a method by which objects can interact in a distributed network. RMI allows one or more objects to be passed along with the request. In addition, the information can be stored in an object which is exchanged via CORBA or DCOM or presented in a declarative manner (such as via XML). As discussed in the above-incorporated patent application IBM Docket No. YO999-111P, conversational protocols (methods) (or the distributed protocols) can be used for achieving distributed implementation of conversational functions supported by a CVM (conversational virtual machine) shell between conversational applications and the CVM shell via conversational APIs or between the CVM and conversational engines via conversational engine APIs. The conversational engine APIs are interfaces between the core engines and applications using them and protocols to communicate with core engines (local and/or networked). The conversational APIs provide an API layer to hook or develop conversationally aware applications, which includes foundation classes and components to build conversational user interfaces.

Similarly, a dialog manager in accordance with the present invention can communicate via APIs with applications and engines (local and/or networked). In this manner, a dialog manager can act on the results and call backs from all remote procedures (procedural calls to remote engines and applications) as if it was a local application so as to, e.g., arbitrate between the applications and resources (local and/or networked) to prioritize and determine the active application, and determine which result to consider as active.

The conversational discovery, registration and negotiation protocols 113, 117 are network protocols (or methods) that are used to "discover" local or network conversationally aware systems (i.e. applications or devices that "speak" conversational protocols). The registration protocols allow devices or applications to register their conversational capabilities, state and arguments. The negotiation protocols allow devices to negotiate master-slave, peer-to-peer or silent partner network.

In one embodiment, the discovery protocols implement a "broadcast and listen" approach to trigger a reaction from other "broadcast and listen" devices. This can allow, for instance, the creation of dynamic and spontaneous networks (such as Bluetooth and Hopping networks discussed below). In another embodiment, a default server (possibly the master) setting can be used which registers the "address" of the different network devices. In this embodiment, the discovery amounts to each device in the network communicating with the server to check the list of registered devices so as to determine which devices connect to such devices. The information that is exchanged via the discovery protocols comprises the following: (1) broadcast requests for handshake or listening for requests; (2) exchange of device identifiers; (3) exchange of handles/pointer for first registration; and (4) exchange of handles for first negotiation.

In one embodiment for implementing the registration protocols, upon connection, the devices can exchange information about their conversational capabilities with a prearranged protocol (e.g., TTS English, any text, Speech recognition, 500 words+FSG grammar, no speaker recognition, etc.) by exchanging a set of flags or a device property object. Likewise, applications can exchange engine requirement lists. With a master/slave network configuration, the master dialog manager can compile all the lists and match the functions and needs with conversational capabilities. In the absence of a master device (dialog manager), a common server can be used to transmit the conversational information to each machine or device in the network. The registration protocols allow the following information to be exchanged: (1) capabilities and load messages including definition and update events; (2) engine resources (whether a given device includes NLU, DM, NLG, TTS, speaker recognition, speech recognition compression, coding, storage, etc.); (3) I/O capabilities; (4) CPU, memory, and load capabilities; (5) data file types (domain specific, dictionary, language models, languages, etc.); (6) network addresses and features; (7) information about a user (definition and update events); (8) user preferences for the device, application or dialog; (9) customization; (10) user experience; (11) help; (12) capability requirements per application (and application state) (definition and update events); (13) meta information for CUI services and behaviors (help files, categories, conversational priorities, etc.) (definition and update events, typically via pointer to table); (14) protocol handshakes; and/or (15) topology negotiation.

Registration may be performed using a traditional communication protocol such as TCP/IP, TCP/IP 29, X-10 or CEBus, and socket communication between devices. The devices use a distributed conversational architecture to communicate to their associated conversational engine and dialog manager, their conversational arguments (e.g., active vocabulary, grammars and language models, parsing and translation/tagging models, voice prints, synthesis rules, baseforms (pronunciation rules) and voice fonts). This information is either passed as files or streams to the dialog manager and the conversational engines, or as URLs. In addition, context information may be transmitted by indicating passing or pointing to the context stack/history of the device or application that the controller can access and add to its context stack. Devices also pass information about their multi-modal I/O and UI capabilities (screen/no screen, audio in and out capabilities, keyboard, etc.) The conversational arguments allow a dialog engine to estimate the relevance of a new query by the NLU engine, based on the current state and context.

With respect to the negotiation protocols, upon registration of needs and capabilities of each of the network devices, the network devices and applications can vote for a given temporary configuration during negotiation. If an application imposes the configuration (i.e., the topology) the decision is automatically imposed. Otherwise it can request to be master or slave or peer. Based on the tally of the requests, a preferred configuration is decided and communicated to all devices and applications (in the table of resources available that each device/application keeps). Whenever a system changes its state and requirement, it will communicate to the other networked dialog managers/resources to initiate a new negotiation and communicate new state and context information.

The speech transmission protocols 114, 118 allow the devices to transmit and receive compressed speech or local processing results to/from other devices and applications on the network. The conversational engines 102, 107 preferably include compression/decompression engines for compressing speech (or results) for transmission and decompressing compressed speech (or results) obtained over the network from another device or application for local processing. The speech transmission protocols are utilized by speech transmission clients executing in the devices to transmit/receive compressed speech to/from other networked devices, systems or applications for processing. The speech transmission clients of the devices operate in conjunction with compression, decompression and reconstruction engines using suitable compression hardware for processing the speech transmitted over the network. The speech coders provide perceptually acceptable or intelligible reconstruction of the compressed speech and optimized conversational performance (e.g., word error rate). The speech is captured (and transformed into features) on the respective networked devices using acoustic signal processing engines (audio subsystems) and suitable audio hardware. In addition, compressed speech file formats can be transmitted and received between devices for processing speech. More specifically, the speech transmission protocols allow the devices to transmit and receive compressed speech or local processing results to/from other devices and applications on the network. In one embodiment, after the handshake process between a transmitting device and a receiving device, a data stream (packet based) is sent to the receiver. The packet headers preferably specify the coding scheme and coding arguments (i.e. sampling frequency, feature characteristics, dimensions, transformation applied on the front-end, nature of the front-end, etc.) using for encoding the speech (or results). In addition, error correcting information can also be introduced (e.g. last feature vector of the previous packet to correct he differential decoders if the previous packet is lost or delayed) or appropriate messaging to recover (re-send) the lost packets.

In addition, the dialog managers can communicate via the dialog manager protocols or DM protocols (as discussed in the above-incorporated IBM Docket No. YO999-111P. The DM protocols are used to negotiate between multiple dialog managers which dialog manager is active or which dialog manager should receive the input. Because in the present case, the server resource is "polled" only when really needed, the DM protocols provide a variation: the local dialog manager a priori tries to determine if the function should be performed remotely. In situations that a mistake is made or doubt exists, the dialog manager may wait for the guess from the local engine and decide to poll a server for comparison in case of remaining doubt.

Therefore, based on the above discussion, it should be clear that the network protocols provide for coordination (or a coordinated interface) between networked devices for sharing conversational services and functions. The term coordinated interface means that a single conversation can be held between the different actors (devices/applications) as if they where all understanding the entire conversation and appropriately knowing who is being addressed at any given time. The behavior of each conversational system or application can be controlled/managed by a dialog manager (e.g., a master in the master-slave mode), the applications (which may establish who is master, slave or peer), a system dialog manager (if any), the architecture and negotiation (in the peer-to-peer mode) to execute each conversational function on the appropriate system, transparently to the user. For the user of a client device, a seamless conversational interface is provided (i.e., all conversational interactions appear to be via a single conversational system), notwithstanding that certain conversational function, systems and resources may be provided several networked devices (e.g., a cellular phone, a pager and a PDA).

One example of a coordinated conversational system (as described above is disclosed in the above-incorporated IBM Docket No. YO999-111P) is a remote control referred to as a UCA (universal conversational appliance). The UCA discovers appliances that are conversationally aware. Each conversationally connected appliance will send its conversational arguments (vocabularies and grammars) to the UCA. The UCA acts as a master for such appliances and will update the appropriate appliance when a conversational interaction with the user results into a command to the appliance. Conversely, upon execution of the command or every time that the appliance changes state, it will send an update to the remote control. A conversational appliance having no other conversational capabilities (other than the corresponding arguments) is what is referred to as a "silent partner".

In another embodiment, a server or base station can perform all the conversational functions, except audio capture compression and shipping which is performed by the remote control (or UCA). The remote control can also provide some UI to the user to inform him/her of the status of the different appliances. This may be done via speech, GUI or any conversational combination of these modalities (and others).

Although conventional network topologies can be employed in connection with the system of FIG. 1, a preferred network topology is one that provides spontaneous dynamic networking (i.e, a network which is spontaneously built between devices that are within a certain communication range). Such spontaneous networking may be implemented using the currently emerging "Bluetooth" networking protocol as described, for example, at http://www.bluetooth.com. Briefly, Bluetooth is a codename for network protocol that provides ad hoc, wireless network connectivity. More particularly, Bluetooth is a protocol for providing short-range wireless radio links between devices (such as smartphones, cellular phone, pagers, PDAs, laptop computers, mobile units, etc.) that are within a particular range to dynamically and spontaneously establish a network (or what is known as a "piconet") between such devices. A piconet refers to a collection of Bluetooth-enabled devices (nodes) connected in an ad hoc manner with one node in each Piconet acting a master during the remainder of the network connection. Two or more piconets can be networked connected to form what is known as a scatternet.

It is to be appreciated that any spontaneous dynamic networking protocol may be implemented in accordance with the present invention. For instance, the network topology of FIG. 1 may be implemented in accordance with the "hopping" communication network described in U.S. patent application Ser. No. 09/198,378, filed on Nov. 24, 1998, entitled "Automated Traffic Mapping," which is commonly assigned and incorporated herein by reference.

Figure 2:
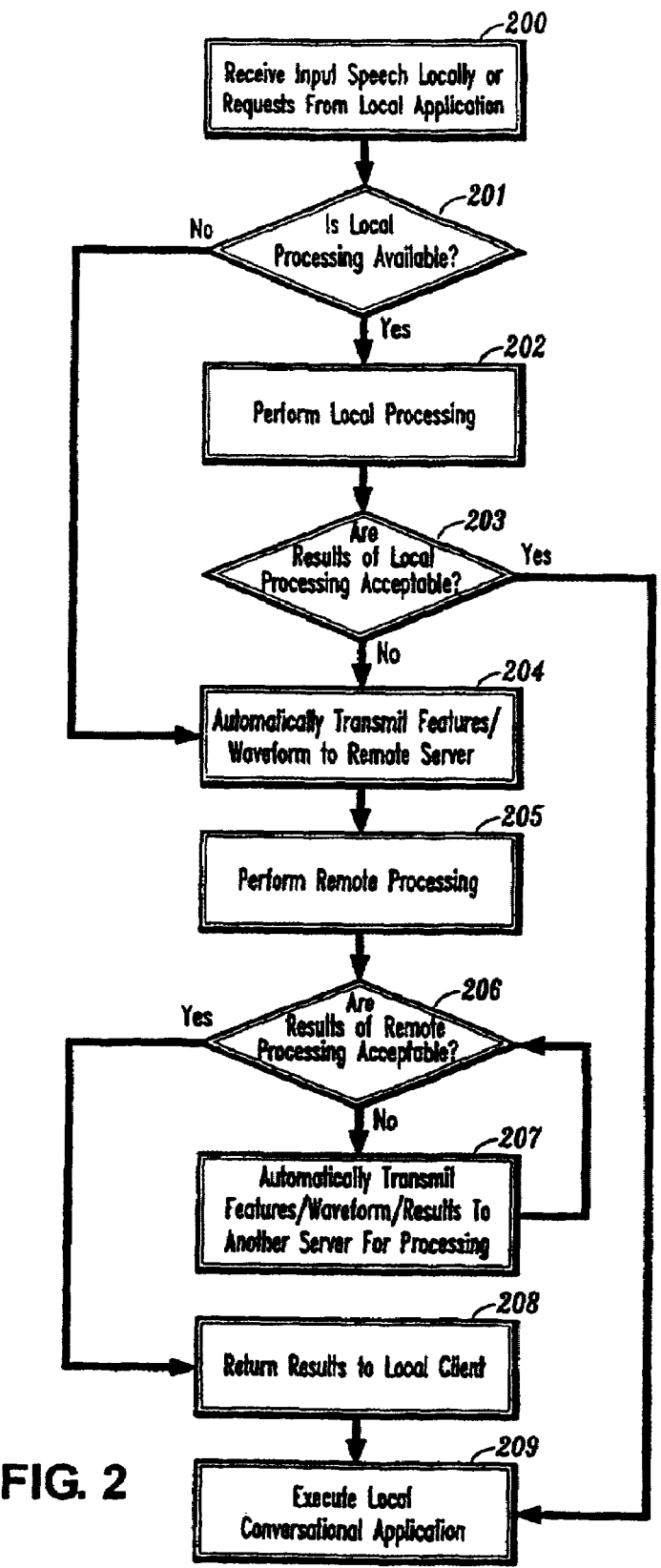
FIG. 2 is a flow diagram of a method for providing conversational services via automatic and coordinated sharing of conversational resources between networked devices according to one aspect of the present invention.

Referring now to FIG. 2, a flow diagram illustrates a method for providing automatic and coordinated sharing of conversational functions between networked devices according to one aspect of the present invention. In particular, FIG. 2 illustrates in further detail one method of operation of the system of FIG. 1. Initially, the user will utter a spoken command (or otherwise issue a query) to the local client device, which is pre-processed, e.g., by digitizing and extracting the relevant features of the digitized speech signal (step 200). Alternatively, the local dialog manager may receive a request from a local application 104 to generate synthetic speech (TTS) for output to the user (step 200).

A determination is made (via the local dialog manager 103) as to whether local processing is available (step 201), e.g., if speech recognition or speech synthesis can be performed locally. It is to be appreciated that for this determination, the local dialog manager 103 can explicitly predefine a remote server where the recognition/synthesis must occur (e.g. a IP address for a socket connection, a URL address for a server based record via servlet or a phone number for direct connections or connection to an IVR). In addition, the determination that the local device does not have the available resources or arguments to perform (or efficiently perform) a task may also be made by the dialog manager 103 upon execution of the local application 104 based on the resource requirements as indicated by the application in a header file. In addition, certain commands or requested functions can cause the dialog manager to automatically connect to a remote server. For instance, security applications (e.g. (speaker verification) can be automatically switched to server side processing so that the voice prints are not distributed to the clients. Furthermore, local car navigation systems can be automatically switched to remote servers using a telephone or socket based server so that the local device does not have to store a large amount of navigation information.

If it is determined that local processing is available (affirmative determination in step 201), then processing will be performed locally (step 202) via local engines 102. On the other hand, if it is determined that local processing is not available (negative determination in step 201), then the relevant features/waveforms/information is automatically transmitted to a remote network-connected server (step 204) (via IP, LAN, Bluetooth, IR, RF or via phone or IP phone), wherein remote processing (e.g., speech recognition/synthesis) is performed (step 205) (possibly with some user/server interaction).

It is to be appreciated that the transmission of speech from the local client to a remote network-connected server (or vice versa) can be performed using various techniques. For instance, there can be direct transmission of the waveform as a file, a stream or a stream of packets. In addition, a compressed waveform may be transmitted using conventional methods such as ADPCM and APC. Furthermore, a stream of features can be transmitted in accordance with the method disclosed in "Compression Of Acoustic Features For Speech Recognition In Network Environments," by G. Ramaswamy et al., Vol. 2, pp. 977-980, Proc. ICASSP, 1998, which is incorporated herein by reference. This method allows recognition (speech recognition, speaker recognition or NLU) on the receiver side but no reconstruction of the signal. In addition, the transmission of speech may be performed using any coding method or scheme based on compressed features and pitch estimation which allows the speech signal to be reconstructed with adequate quality for intelligible and even pleasant playback (for playback, correction, further human processing, or archiving). Such coding schemes should provide data rates as low as between 4 kbits/s and 5 kbit/s with no degradation of the recognition performances. As a result, interactive exchanges can be performed in real time with the backend (server) resources even over wireless modems or wireless data links. It is to be understood that other schemes could be employed using similar coding schemes that would provide very high quality playback. In addition, any method which allows compression of the cepstra features and pitch allowing recognition (speech, speaker, NLU) on the server side with no degradation on the receiving side and reconstruction of the signal can be utilized in connection with the present invention. This reconstruction is useful for later playback form the server or playback from the client (if stored locally) of for subsequently proofreading the transcription, error correction, or human monitoring of the process. It is to be understood that any suitable compression scheme (coding protocol) can be used.

It is to be appreciated that the compression or coding scheme (transmission protocols or coding protocols) can vary between devices. For instance, the coding to ship input speech from the audio capture system (of the client) to a networked resource may be different from the coding protocol used to ship output speech (e.g. prompts, playback or TTS) from the networked resource (server) to the audio output (client). Indeed, in the first case, the coding should be optimized to provide good recognition performance on the server side, with the reconstruction for playback being important but not dramatically important. Of course bit rate (compression ratio) is important. The trade-off in compression rate can be adapted between robustness (error rate—feature distortion) and perceptual quality to reach and adhere to a target bit rate. Also, certain schemes may be selected to add robustness to some channel or background distortions. On the other hand, for the latter task (output signal), the coding should be optimized for intelligibility or perceptual quality and pleasantness, or to preserve some special features of the voice or the audio.

After either local processing (step 202) or remote processing (step 205), a determination is made (via the local dialog manager 103 or server dialog manager 108) as to whether the results of the processing are acceptable (steps 203 and 206). If it is determined that the processing results are not acceptable (negative determination in step 203 or step 206), the local client or remote server will automatically forward the features or waveform to a server (via IP, LAN, Bluetooth, IR, RF or connect via phone or IP phone) that is capable of performing such processing (step 204 or step 207). For instance, the rejection of results for speech recognition and NLU may occur if such results are unknown or mis-recognized or ambiguous (or based on confidence measures associated with the dialog manager of each resources (local or server)). Preferably, the automatic connection from the local or remote system to a server system can be based on the level of the acoustic and LM (language model) scores returned by the local speech decoder using, for example, the techniques taught in U.S. Pat. No. 5,937,383 to Ittycheriah et al., entitled "Apparatus and Methods For Speech Recognition Including Individual or Speaker Class Dependent Decoding History Caches For Fast Word Acceptance or Rejection," which is commonly assigned and incorporated herein by reference (e.g., the remote server is contacted when these scores are determined to fall below a given threshold). It is to be understood that any suitable measure or approach to estimate the confidence or the recognized utterance or query (during or after the dialog) can be used to determine if the results obtained by a conversational system are acceptable or not (in which case another system is considered).

Similarly for TTS, the local and remote dialog managers 103, 108 can examine the complexity of the text to determine if the TTS will be performed locally or remotely. For example, TTS will be performed remotely when the pronunciation rules for a word are not known or when the text requires complex parsing. Another example is if the TTS must be pronounced with a different accent, dialect, or in a different language or if it is supposed to imitate somebody's particular sentence.

After processing is remotely performed, the results are sent back to the local client (step 208) (via phone, IP address, MAC (media access control) address etc.). It is to be appreciated that the output (i.e., the speech output to the user) can be synthesized locally or on the server. If synthesis is performed on the server, the synthesized speech can be transmitted in compressed form (using the speech transmission protocols as discussed above) to the client for local decompression. It is to be understood that the coding scheme can be the same or different from the scheme used to transmit the speech features from the client to the server. Alternatively, the speech can be directly "broadcasted" by the server, for example, over another analog PSTN line, with the connection that can be established via phone call from the client to the server (callback).

Recently efforts have been initiated to develop appropriate confidence measures for the recognized speech. For instance, in "LVCSR Hub5 Workshop," Apr. 29–May 1, 1996, MITAGS, MD, organized by NIST and DARPA, different approaches are proposed to attach a confidence level to each word a confidence level. One method uses decision trees trained on word-dependent features (amount of training utterances, minimum and average triphone occurrences, occurrence in language model training, number of phonemes/lefemes, duration, acoustic score (fast match and detailed match), speech non-speech), sentence-dependent features (signal-to-noise ratio, estimates of speaking rates: number of words or of lefemes or of vowels per second, sentence likelihood provided by the language model, likelihood ratios, normalized average likelihood per frame, trigram occurrence in the language model), word in a context features (trigram occurrence in language model) as well as speaker profile features (accent, dialect, gender, age, speaking rate, identity, audio quality, SNR etc. . . . ). A probability of error is computed on the training data for each of the leaves of the tree. Algorithms for building such trees are discussed by Breiman et al, in "Classification and Regression Trees," Chapman & Hal, 1993. At recognition, all or some of these features are measured during recognition and for each word the decision tree is walked to a leave which provides a confidence level. In addition, in the reference by Neti, et al. entitled "Word Based Confidence Measures As A Guide For Stack Search In Speech Recognition," ICASSP97, Munich, Germany, April, 1997, a method is described which relies entirely on scores returned by an IBM stack decoder (using log-likelihood—actually the average incremental log-likelihood, detailed match, fast match).

In the LVCSR proceeding, another method to estimate the confidence level is performed using predictors via linear regression. The predictors used are: the word duration, the language model score, the average acoustic score (best score) per frame and the fraction of the NBEST list with the same word as top choice. It is to be appreciated that in accordance with one embodiment of the present invention, the two approaches (confidence level measured via decision trees and via linear predictors) are combined to systematically extract the confidence level in any translation process, not limited to speech recognition.

Based on past progress and the speed of advance in this area, we can now say that for several kinds of translations, one can associate a confidence value, e.g., from 0 to 1, with 0 meaning no translation performed and 1 meaning certainty, to components being translated, where components can be texts, phrases, words, and more generally any logical block of material to translate. The combination of linear predictors and decision trees as described above is a method that is preferably employed for the present invention. Indeed, by way of example, the accumulation of scores returned by a speaker recognition engine (fast match score and detailed match score as well as scores of the background models and cohorts) can be used to build a decision tree and/or a linear predictor of the confidence level that the speaker is indeed correctly authenticated. In fact, in the case of speaker identification, this amounts to performing verification on the identity obtained by the identification stage.

It is to be appreciated that the remote servers can send information such as TTS rules or baseforms, grammars, etc., to the local client for storage in a cache so that the local device can subsequently process a similar request locally using such information. Because a local device may not be able to perform a certain task due to lack of required resources, the decision by the server dialog manager 108 to send such processing information to the local client can be made in accordance with the registration (via the registration protocols as discussed above) by the local device of its conversational capabilities with the remote server upon connecting with the remote server.

Figure 3:
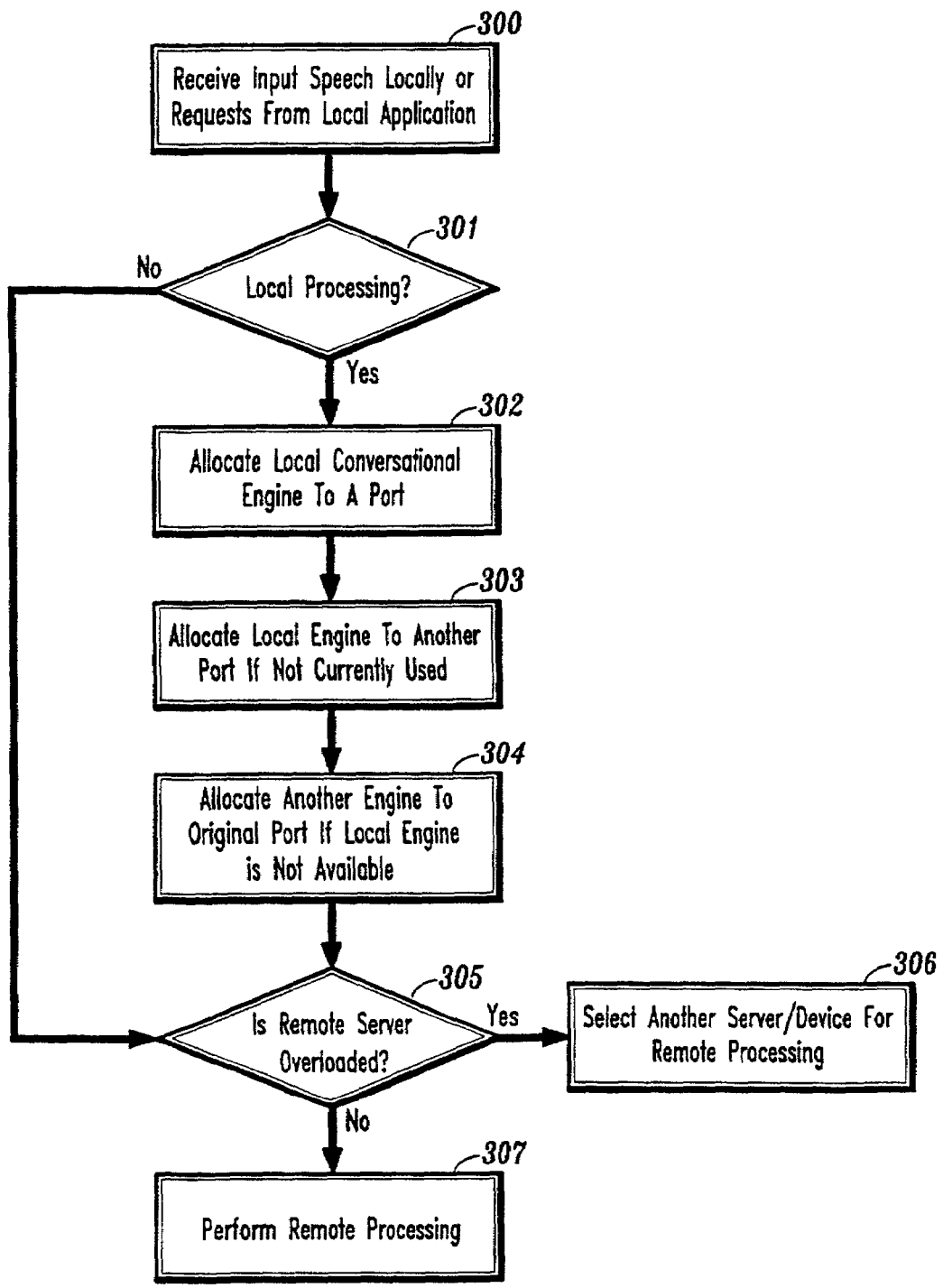
FIG. 3 is a flow diagram of a method for providing conversational services via automatic and coordinated sharing of conversational resources between networked devices according to another aspect of the present invention.

It is to be appreciated that the present invention may be implemented in situations where amount of conversational functions executed by a device (via its dialog manager) is such that device is unable to provide the necessary resources for a timely execution of the functions (e.g. and IVR with too many simultaneous port used by the system). Therefore, the dialog manager can be implemented for providing conversational system management and load management, whereby the dialog manager can decide during the execution of a particular function to utilize another conversational system to continue processing the requested function. In particular, referring to FIG. 3, initially the user will utter a spoken command to the local client device, which is preprocessed, e.g., by digitizing and extracting the relevant features of the digitized speech signal (step 300). Alternatively, the local dialog manager may receive a request from a local application 104 to generate synthetic speech (TTS) for output to the user (step 300). The dialog manager will determine if local processing should be performed (step 301) (whether it be for speech recognition, dialog management or speech synthesis, for example). This decision can be based not only on the local conversational capabilities, arguments and resources (as discussed above), but also based on estimates of the delay that the network will introduce due to network traffic congestion as compared to the possible delay that may be introduce in performing the conversational function using available but constrained local resources (assuming the local and remote device can perform the same functions). Therefore, when command and control functions, for example, are threatened to be delayed locally/over the network can be executed remotely/locally to minimize the delay. Indeed, queries that can handle longer delay (e.g. because associated to back end functions that can accommodate delays such as Internet or audio-visual searches) can be executed on a system (local or networked) that optimizes the resources or cost.

In addition, in cases where the networked connection is temporary unavailable, or in the absence of networked resources, all the functions that can be performed locally will be performed. The others functions can be subdivided into functions that can be executed in deferred mode (later when connection can be re-established) and incompatible functions. Typical examples are updates of address book, answers to e-mail or message via dictation or dictation in general. Again, preferably the application can determine if the command is local or deferred. It is also possible to consider a peer-to-peer with deferred mode, where a deferred mode manager and a local engine determine if the function is local or deferred.

Referring again to FIG. 3, if the dialog manager determines that local processing is proper (affirmative decision in step 301), the dialog manager will allocate the necessary conversational engine to the port (step 302). Once the conversational engine is allocated to the port, the dialog manager can allocate that engine to other ports if the conversational engine is not currently being used by the originally allocated port (step 303) (e.g, when the speaker is not currently speaking but listening). When the local engine is again needed by the originally allocated port, if the local engine is not available, another available engine (locally or on a remote device) can be utilized (step 304). This dynamic assignment process is in contrast to conventional load management in which a dialog manager decides and allocates a conversational engine(s) to each port for the entire duration of a function call.

It is to be appreciated that the management and decision to transmit speech, for instance, to a network server or device can be based not only on the level of system management/load balancing (by the dialog manager on a client or server), but also on the traffic of the network. For instance, if a connection (especially for TCP/IP based network connections over the Internet) is deemed overloaded (step 305), a new server or device can be selected based on the traffic (step 306). This decision can be made on top of conventional protocols such as VoIP (Voice Over Internet Protocol) protocols like RSVP (resource reservation protocol), whereby when a channel is needed, the connection can be made along with an appropriate reservation of the associated quality of service. Otherwise, remote processing will be performed (step 307) and the results returned as discussed above.

It is to be appreciated that the system and methods described herein can be implemented for various speech enabled and conversational applications. The present invention is particularly useful to meet the growing demand in the embedded and pervasive computing world as well as NLU/NLG dialog systems. It is to be understood, however, that the present invention may be deployed for a variety of applications not limited to embedded systems. The following exemplary embodiments will illustrate the advantages of the present invention.

For example, commercially available embedded name dialers for use with a smartphone (e.g., a wireless phone with PDA (personal digital assistant) capabilities) is a typical application. For example, assume the client device 100 is a smartphone with a name dialer local application. The user will store locally a list of desired names and addresses in the electronic address book of the smartphone. The user can then utter a command such as "dial first name last name at . . . possible qualifier (home, office, cell phone), and upon recognition/understanding of the command (via the local conversational engines 102), the smartphone will automatically dial the phone number associated with the person in the address book (via the local applications 104). On the other hand, when a name is uttered that is not within the address book (and therefore not recognized/understood), but which is in a larger corporate (or public) directory (as contained in remote server 106), the request can be saved (in features or in waveform) and transmitted to a remote server 106 for recognition. Then dialing can be performed directly by the remote server or by the smart phone upon receiving the appropriate information from the remote server. Alternatively, the user can be connected to the remote server in the first instance and establish a dialog to either re-request the name to be dialed or ask for further information (in the case of the white or yellow page type of service).

Another useful application of the present invention relates to a personal information system such as the commercially available PointCast (see http.//www.pointeastcom), which allows a user to obtain, for example, stock quotes, specific news on a subject and information about the latest publication on the subject, based on a predetermined user preferences. With a personal information system structured in accordance with the present invention, if a user desires to obtain information about a stock (e.g., IBM) or a subject (e.g., forecast for the production of green peas in Kent), the user will utter a speech request to the client device 100. If "IBM" is in the local vocabulary (user profile) it will be immediately decoded and the user will get the latest quote, e.g., obtained at the last update (PointCast). On the other hand, if the user request regarding "green peas" was not understood by the local client device 100, the request is automatically forwarded as feature stream to a remote server 106 (of the content provider), wherein the server can invest more resources at decoding such request and retrieve the associated information (which would have had to be done anyway), and then transmit such information to the local system. If the remote server system follows a "push approach", this can be done at the next update (e.g., PointCast).

The client device 100 may also be a speech-enabled PVA (personal vehicle assistant) for providing, e.g., conversational car navigation. For instance, if the user does not want to use a CD-ROM with the system (because of lack of space, power requirements, weight, cost, resistance to shocks etc), the user could decide to store limited information such as the vocabulary and the maps associated with regions/locations where the user is currently located, where the user was recently located, and where the user want to travel. In this example, whenever a user request does not match the local vocabulary and map sets, the request can be automatically sent to a remote server 106 and decoded (even with prompts back to the user to narrow the search) to have the itinerary, maps (or map updates) downloaded to the car. Again, such action would be essentially transparent to the user (even if costly to download) as only the local road would be initially needed.

Furthermore, a NLU/FSG system can be designed in accordance with the present invention so that if the user's request requires FSG (finite state grammar), the request can be processed locally unless the request is more complex and natural, thereby requiring forwarding to a remote server for recognition.

The corporate name-dialer service offers another interesting feature. A corporation will maintain an active database of phone numbers for its employees. These database is always up to date. Periodically the user can select to synchronize its local information with the corporate database. This is a classical concept. However, when the user utilizes the name dialer and needs to connect via TCP/IP to the server, the synchronization can be done (during the speech recognition phase so that the local dialing information is always updated. Similarly, when the user requests information for navigation to a new location not included in the user's local map, the system can download the acoustic information on the local PVA, as well as a set of navigation information for the region where the user expects to travel.

The system of FIG. 1 may also be implemented with the conversational browser system described in IBM Docket No. YO998-392P, filed concurrently herewith, entitled "Conversational Browser and Conversational Systems," (i.e., International Appl. No. PCT/US99/23008, filed on Oct. 1, 1999 and corresponding U.S. patent application Ser. No.

09/806,544), which is commonly assigned and incorporated herein by reference, wherein a CML (conversational markup language) page, which is similar in concept to HTML (hypertext markup language) page for visual display, transmitted from a content provider (server) (and processed by the conversational browser) is used to describe a conversational UI to be presented to the user. In this example, the conversational browser can be the local application 104 of the client device 100 and/or the server application 109 in the remote (IVR) server 106. It is possible for the content provider or application developer (or the proxy/transcoder) to decide that a given item that the user should provide (for example a NLU or FSG input of a form or a free form to fill via dictation) must be recognized on the server 106 rather than furnishing all the data to the client device 100 for local recognition (because the task is too complex for the local resources or because too much information would have to be sent through the network). This is done, for example, by providing a URL (uniform resource locator) and tags in a CML file to indicate a sever in which the processing will occur, or by loading in the CML page an applet, an Active X component or a plug-in (or whatever variation of it) which capture the audio, performs possibly some conversational functions and ship it to other devices for other functions (this is typically a decision made by the author of the page). This decision can be automatically performed by a transcoder and a registration mechanism as described in IBM Docket No. YO998-392P, whereby the browser explicitly describes its capability to the server where it fetches the CML page. When the transcoder is used to additionally take into account the capabilities of the browser and adapt the content to such capabilities (this capability is what is referred to a conversational proxy), the transcoder can add the server URL(s) to redirect the server now on the basis of the browser's capabilities. In such cases, the speech collected by the client device 100 can be sent as a waveform (compressed or not) or as stream of features to either the remote server 106 or the networked server 110 where the recognition occurs (or NLU/NLG). The recognition result can then be sent back to the client device 100 or to the CML provider server (remote server 106) to decide the next course of action or further processing. Again as mentioned above, this can be decided by the application that can directly incorporate the URL of the resource/engine/server or local device to be used for the recognition of a given input, menu form or dialog. In addition, the present invention is useful in circumstances where a CML page must playback/synthesize sounds or text too complex for the local conversational engines 102 of the local device 102. The portions that are too complex may be obtained as stream of features or compressed waveforms from either a specific server (which may or may not be the server that provided the CML page). Furthermore, with regard to multi-lingual systems, if a CML page involves a different language, the local client device 100 without the appropriate capability can request a remote server to perform the conversational functions in that language.

Figure 4:
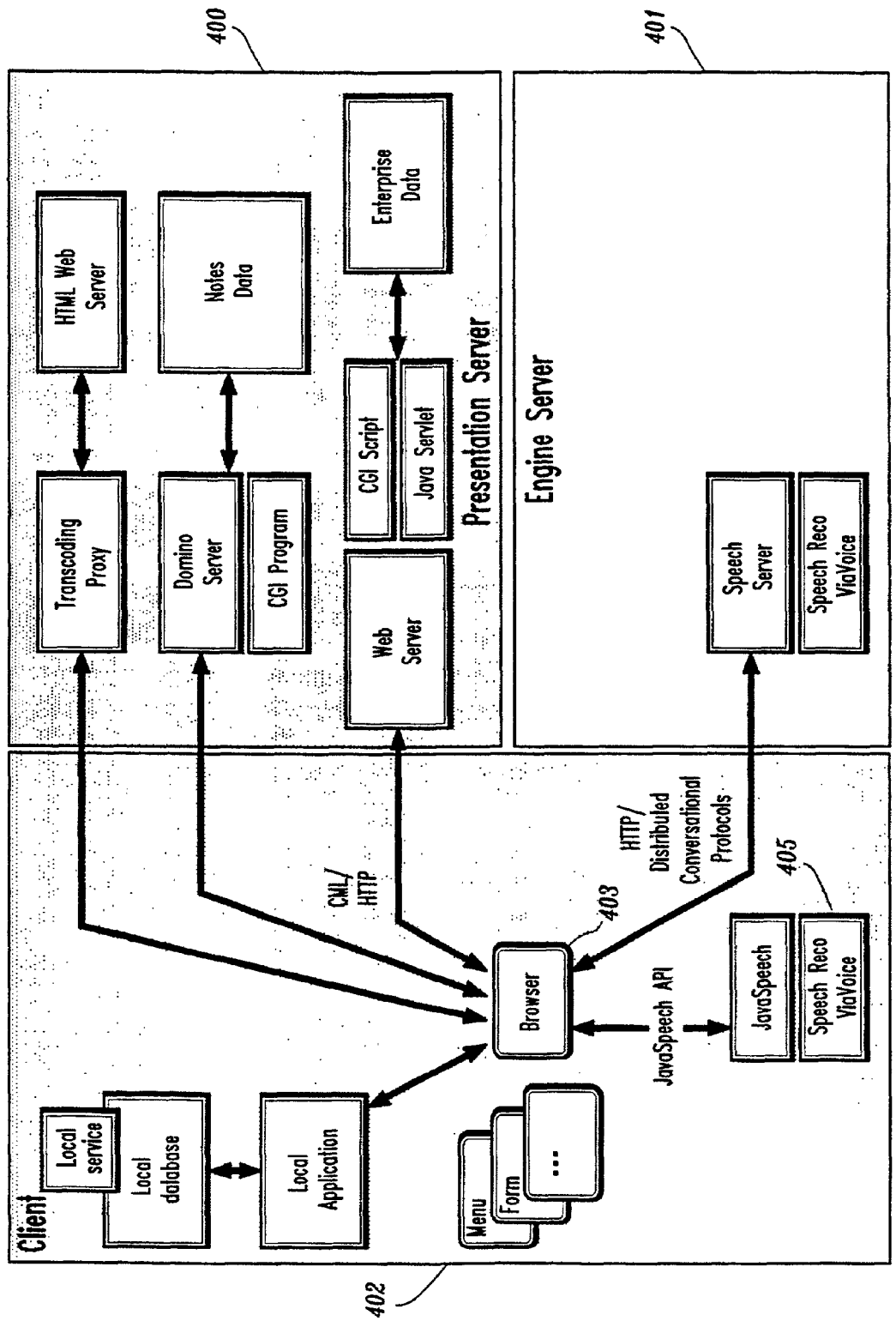
FIG. 4 is a block diagram of a distributed system for providing conversational services according to another embodiment of the present invention employing a conversational browser.

It is to be appreciated that conversational coordination may be employed in distributed applications with a conversational browser. For example, referring to FIG. 4, a distributed system having a presentation server 400, an engine server 401, and a client 402 having a conversational browser 403 (as discussed in the above referenced Y0998-392P). The browser 403 receives pages of CML from the presentation server 400 and processes the CML pages. The CML page may contain information that allows the browser 403 to determine where to send speech for processing. A speech server is located on the engine server 401. Assuming the CML page requires processing of the speech by the engine server 401, the browser 403 can communicate (transmit calls) to the speech server via HTTP (or sockets or RMI) to ship audio to the speech server and send the appropriate data file instructions and engine calls. The browser 403 of the client is assumed to have some local processing capabilities to perform speech processing (via speech API and speech recognition engine 405). As noted above, the shift between local speech processing and server-side speech processing is determined by the CML page received from the presentation server 400. This determination can be coded by the content provider or the adaptation to the device (the client 402 decides that it cant perform the task and sends it to a known or discovered server or transcoder).

Figure 5:
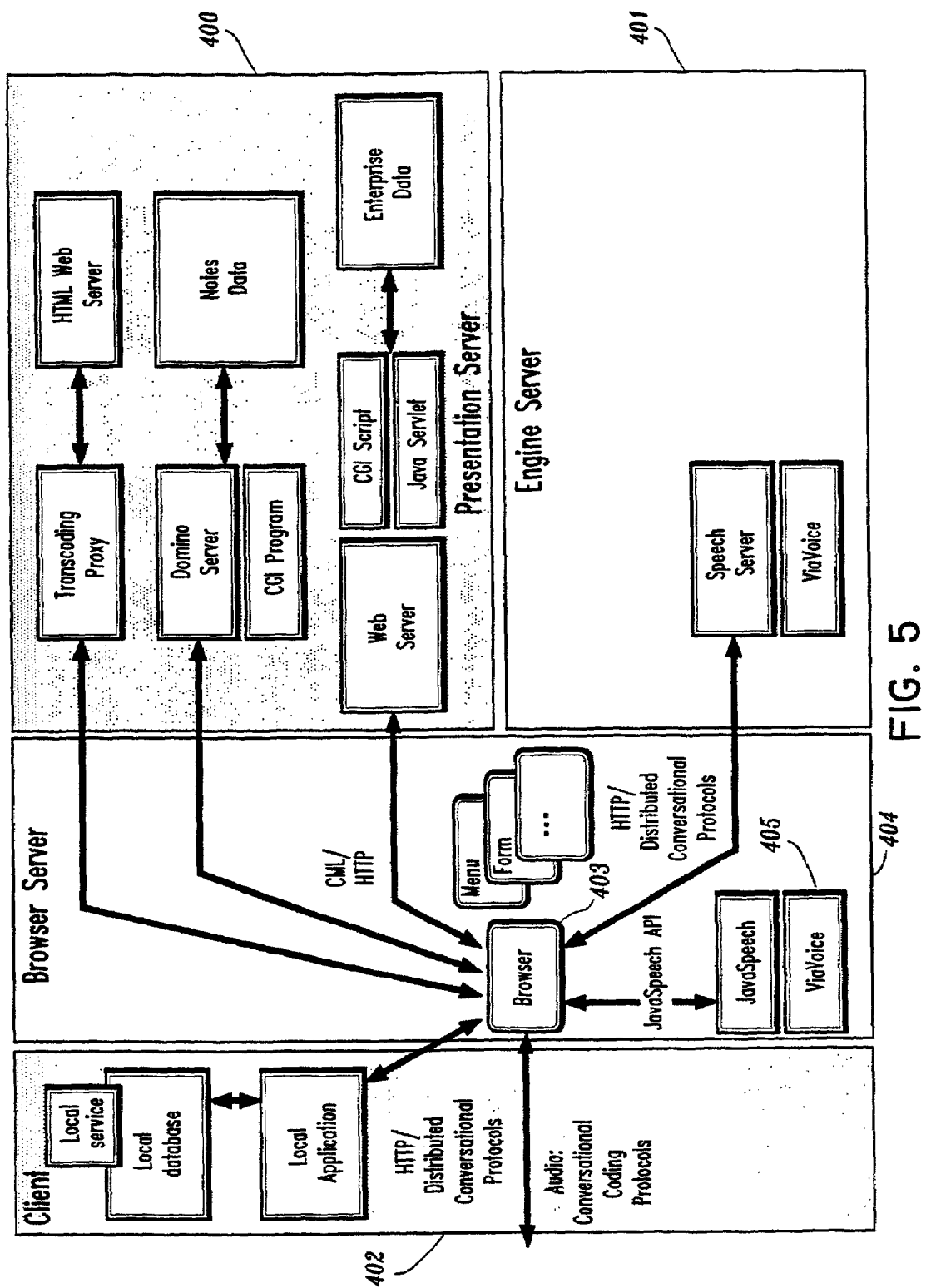
FIG. 5 is a block diagram of a distributed system for providing conversational services according to another embodiment of the present invention employing a conversational browser.

In FIG. 5, the browser 403 is located on a browser server 404 which is accessed by the client 402 (the browser server 404 acts as an intermediary between the client 402 and presentation server 400). Again, the browser 403 determines whether to perform local or server-side processing. The audio is may be shipped using conversational coding as described herein.

The present invention allows a low resource client device to transparently perform simple tasks locally, as well as complex tasks in binary or analog connection with a server (or other device) having more complex conversational capabilities. The server-side functions (such as speech recognition) can be performed through a regular IP network or LAN network as well as via digital transmission over a conventional telephone line or a packet switched network, or via any conventional wireless data protocol over a wireless network. The analog/digital connection embodiment describes at least two scenarios. First, it is a binary connection implemented with the equivalent of a modem and all the functions are data transfer functions. In addition, when a server/distributed resource is involved, the system can call a telephony server as resources and voice is sent over the network (instead of data of the waveform or transformation of it—such as cepstra). An example of such a scenario is a wireless connection with local speech recognition functions (name dialer and digit dialer) which connects via a regular wireless connection to a telephony server with an IVR for other functions like voice browsing the Internet, obtaining stock/mutual fund quotes and performing banking transactions by voice. This mechanism can be used today with existing cell phones equipped with some speech recognition capabilities on the device.

In addition, various mechanism can be used to manage traffic and resources that are distributed across the network to guarantee appropriate dialog flow of a conversational interaction across the network. Such mechanisms include: conversational protocols (as discussed above), audio: RecoVC (Recognition Compatible VoCoder) (the coding protocol with pitch that allows reconstruction for play back), applications and meta-information: distributed application protocol, discovery, registration, negotiation, server load management to maintain dialog flow, traffic balancing and routing to maintain dialog flow, engine server selection based on task features and capability requirements and conversational argument availability (data files), conversational arguments distribution: storage, traffic/routing and caching.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

The invention claimed is:

1. A method for providing automatic and coordinated sharing of conversational resources between network devices, comprising the steps of:
   receiving a request for a conversational service by a first network device;
   determining by the first network device whether to process the requested conversational service one of locally using conversational resources of the first network device, remotely using conversational resources of at least a second network device, or locally and remotely using both the local and remote conversational resources; and
   automatically communicating with the at least second network device, if it is determined that the conversational service will be processed, at least in part, remotely using the conversational resources of the at least second network device,
   wherein the step of determining comprises the steps of determining whether local conversational resources are available for processing the requested conversational service; and wherein the method further comprises the steps of:
   executing the requested conversational service using the local conversational resources, if it is determined that local conversational resources are available for processing the requested conversational service;
   determining if results of the local processing is acceptable; and
   automatically accessing the at least second network device to remotely process the requested conversational service, if it is determined that the results of the local processing are not acceptable.

2. The method of claim 1, further comprising the step of transmitting messages using conversational protocols to establish coordinated network communication between the first and at least second network device for sharing the conversational resources.

3. The method of claim 2, wherein the step of automatically accessing comprises the steps of:
   automatically establishing a network connection with the at least second network device by transmitting messages using the conversational protocols; and
   transmitting compressed speech features or compressed waveform to the at least second network device.

4. A program storage device readable by a machine, tangibly embodying a program of instructions executable by the machine to perform method steps for providing automatic and coordinated sharing of conversational resources between network devices, the method steps comprising:
   receiving a request for a conversational service by a first network device;
   determining by the first network device whether to process the requested conversational service one of locally using conversational resources of the first network device, remotely using conversational resources of at least a second network device, or locally and remotely using both the local and remote conversational resources; and
   automatically communicating with the at least second network device, if it is determined that the conversational service will be processed, at least in part, remotely using the conversational resources of the at least second network device,
   wherein the instructions for performing the determining step comprise instructions for performing the steps of determining whether local conversational resources are available for processing the requested conversational service; and wherein the program storage device further comprises instructions for performing the steps of:
   executing the requested conversational service using the local conversational resources, if it is determined that local conversational resources are available for processing the requested conversational service;
   determining if results of the local processing is acceptable; and
   automatically accessing the at least second network device to remotely process the requested conversational service, if it is determined that the results of the local processing are not acceptable.

5. The program storage device of claim 4, further comprising instructions for performing the step of transmitting messages according to conversational protocols to establish coordinated network communication between the first and at least second network device for sharing the conversational resources.

6. The program storage device of claim 5, wherein the instructions for performing the step of automatically accessing comprise instructions for performing the steps of:
   automatically establishing a network connection with the at least second network device using the conversational protocols; and
   transmitting compressed speech features or a compressed waveform to the at least second network device.

* * * * *